United States Patent
Himeno

(10) Patent No.: US 12,339,932 B2
(45) Date of Patent: Jun. 24, 2025

(54) CLASSIFICATION SYSTEM

(71) Applicant: IRYOU JYOUHOU GIJYUTU KENKYUSHO CORPORATION, Fukuoka (JP)

(72) Inventor: Shinkichi Himeno, Yame-gun (JP)

(73) Assignee: IRYOU JYOUHOU GIJYUTU KENKYUSHO CORPORATION, Yame-gun (JP)

(*) Notice: Subject to any disclaimer, the term of this patent is extended or adjusted under 35 U.S.C. 154(b) by 316 days.

(21) Appl. No.: 17/462,703

(22) Filed: Aug. 31, 2021

(65) Prior Publication Data

US 2021/0397905 A1 Dec. 23, 2021

Related U.S. Application Data

(63) Continuation-in-part of application No. PCT/JP2020/008822, filed on Mar. 3, 2020.

(30) Foreign Application Priority Data

Mar. 5, 2019 (JP) .................. 2019-039332

(51) Int. Cl.
*G06F 18/243* (2023.01)
*G06F 16/55* (2019.01)
(Continued)

(52) U.S. Cl.
CPC ........ *G06F 18/24323* (2023.01); *G06F 16/55* (2019.01); *G06F 18/217* (2023.01); *G06F 18/2413* (2023.01)

(58) Field of Classification Search
None
See application file for complete search history.

(56) References Cited

U.S. PATENT DOCUMENTS

| | | | |
|---|---|---|---|
| 2010/0040285 A1* | 2/2010 | Csurka | G06V 10/464 382/170 |
| 2010/0211125 A1* | 8/2010 | Johnson | A61B 5/6846 607/4 |

(Continued)

FOREIGN PATENT DOCUMENTS

| | | | |
|---|---|---|---|
| JP | 2000353173 A | 12/2000 |
| JP | 2013077127 A | 4/2013 |

(Continued)

OTHER PUBLICATIONS

Leendert van Gastel and André Heck. Interactive Java Tutorial, 3.1 OOP: Class Hierarchy. http://web.archive.org/web/20141016214023/https://staff.fnwi.uva.nl/a.j.p.heck/Courses/JAVAcourse/ch3/s1.html. Archived Oct. 16, 2014. (Year: 2014).*

(Continued)

*Primary Examiner* — Matthew C Bella
*Assistant Examiner* — Johnny B Duong
(74) *Attorney, Agent, or Firm* — Maier & Maier, PLLC

(57) ABSTRACT

A classification system configured to obtain class determination data, perform classification on the basis of the class determination data, and check appropriateness of individual candidate classes in a candidate class list obtained via classification, by storing attributes of the candidate classes and checking the candidate classes against the stored attributes. By checking the appropriateness of individual candidate classes via a previously-constructed database in which the attributes of classes are stored, and by making comparisons as to whether the attributes of the respective candidate classes match class determination data and allowing the user to explain the reason for classification, the accuracy and explainability of the classification system can be improved.

7 Claims, 9 Drawing Sheets

(51) Int. Cl.
  *G06F 18/21*  (2023.01)
  *G06F 18/2413*  (2023.01)

(56) References Cited

U.S. PATENT DOCUMENTS

2012/0023050 A1* 1/2012 Georgopoulos ....... G16H 50/70
                                                                706/20
2018/0293465 A1   10/2018 Kanada
2020/0311616 A1*  10/2020 Rajkumar ............. G06N 3/008

FOREIGN PATENT DOCUMENTS

| JP | 2014006613 A | 1/2014 |
| JP | 2018175226 A | 11/2018 |
| JP | 2018194881 A | 12/2018 |
| JP | 2019003396 A | 1/2019 |

OTHER PUBLICATIONS

Z. Akata, F. Perronnin, Z. Harchaoui and C. Schmid, "Label-Embedding for Attribute-Based Classification," 2013 IEEE Conference on Computer Vision and Pattern Recognition, Portland, OR, USA, 2013, pp. 819-826, doi: 10.1109/CVPR.2013.111. (Year: 2013).*

B. Jyothi, Y. MadhaveeLatha and P. G. K. Mohan, "An effective multiple visual features for Content Based Medical Image Retrieval," 2015 IEEE 9th International Conference on Intelligent Systems and Control (ISCO), Coimbatore, India, 2015, pp. 1-5, doi: 10.1109/ISCO.2015.7282301. (Year: 2015).*

Shrivastava, Abhinav, et al. "Constrained Semi-Supervised Learning Using Attributes and Comparative Attributes." Computer Vision—ECCV 2012, edited by Andrew Fitzgibbon et al., Springer, 2012, pp. 369-383. Springer Link, https://doi.org/10.1007/978-3-642-33712-3_27. (Year: 2012).*

Csurka, Gabriela, and Florent Perronnin. "An efficient approach to semantic segmentation." International Journal of Computer Vision 95 (2011): 198-212. (Year: 2011).*

Mahajan, Dhruv, Sundararajan Sellamanickam, and Vinod Nair. "A joint learning framework for attribute models and object descriptions." 2011 International Conference on Computer Vision. IEEE, 2011. (Year: 2011).*

Binder, Alexander, Klaus-Robert Müller, and Motoaki Kawanabe. "On taxonomies for multi-class image categorization." International Journal of Computer Vision 99 (2012): 281-301. (Year: 2012).*

Cheng, Heng-Tze, et al. "Nuactiv: Recognizing unseen new activities using semantic attribute-based learning." Proceeding of the 11th annual international conference on Mobile systems, applications, and services. 2013. (Year: 2013).*

Pendyala, Vishnu S., and Silvia Figueira. "Automated medical diagnosis from clinical data." 2017 IEEE Third International Conference on Big Data Computing Service and Applications (BigDataService). IEEE, 2017. (Year: 2017).*

Brucker, Florian, Fernando Benites, and Elena Sapozhnikova. "Multi-label classification and extracting predicted class hierarchies." Pattern Recognition 44.3 (2011): 724-738. (Year: 2011).*

Glinka, Kinga, Agnieszka Wosiak, and Danuta Zakrzewska. "Improving children diagnostics by efficient multi-label classification method." ITIB 2016 KamieÅÅlÄski, Poland, Jun. 20-22, 2016 Proceedings, vol. 1. Springer International Publishing, 2016. (Year: 2016).*

International Search Report issued on Jun. 2, 2020 in corresponding International Application No. PCT/JP2020/008822; 4 pages.

Notice of Reasons for Refusal issued on Jul. 5, 2019 in corresponding Japanese Application No. 2019-039332; 8 pages.

Notice of Reasons for Refusal issued on Dec. 6, 2019 in corresponding Japanese Application No. 2019-039332; 6 pages.

* cited by examiner

Fig. 3

|  | CASE 1 | CASE 2 | ... |
|---|---|---|---|
| CHEST PAIN | − | + | ... |
| STMACHACHE | + | − | ... |
| FEVER | + | + | ... |
| LEUKOCYTOSIS | + | − | ... |
| ... | ... | ... | |

CLASS DATA

→ CLASSIFIER LEARNING →

|  | CASE 1 | CASE 2 | ... |
|---|---|---|---|
| | APPENDICITIS | MYOCARDIAL INFARCTION | ... |

CORRECT CLASS

Fig. 4

|  | CASE 1 | CASE 2 | ... |
|---|---|---|---|
| CHEST PAIN | − | + | ... |
| STOMACHACHE | + | − | ... |
| FEVER | + | + | ... |
| LEUKOCYTOSIS | + | − | ... |
| CHEST TENDERNESS | + | − | ... |
| ... | ... | ... | |

CLASS DATA

FREQUENCY OF DISEASE HAVING CHEST PAIN
- APPENDICITIS 2
- MYOCARDIAL INFARCTION 90
- ...

CHEST PAIN

FREQUENCY OF DISEASE HAVING STOMACHACHE
- APPENDICITIS 60
- MYOCARDIAL INFARCTION 5
- ...

STOMACHACHE

CLASSIFIER LEARNING

| CASE 1 | CASE 2 | ... |
|---|---|---|
| APPENDICITIS | MYOCARDIAL INFARCTION | ... |

CORRECT CLASS

Fig. 5

CLASS ATTRIBUTE STORAGE MEANS

CLASS 1: DOG

ATTRIBUTE 1: ANIMAL

ATTRIBUTE 2: FOUR-LEGGED

ATTRIBUTE 3: HOMEOTHERMAL

ATTRIBUTE 4: WITH HAIR

ATTRIBUTE 5: REFERENCE IMAGE

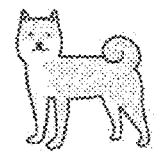

⋮

CLASS 2: CAT

ATTRIBUTE 1: ANIMAL

ATTRIBUTE 2: FOUR-LEGGED

ATTRIBUTE 3: HOMEOTHERMAL

ATTRIBUTE 4: WITH HAIR

ATTRIBUTE 5: REFERENCE IMAGE

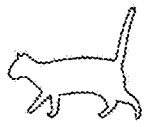

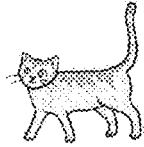

⋮

CLASS 3: DOMESTIC DUCK

ATTRIBUTE 1: ANIMAL

ATTRIBUTE 2: TWO-LEGGED

ATTRIBUTE 3: HOMEOTHERMAL

ATTRIBUTE 4: WITH HAIR

ATTRIBUTE 5: REFERENCE IMAGE

⋮

CLASS 4: CROCODILE

ATTRIBUTE 1: ANIMAL

ATTRIBUTE 2: FOUR-LEGGED

ATTRIBUTE 3: POIKILOTHERMAL

ATTRIBUTE 4: WITH HAIR

ATTRIBUTE 5: REFERENCE IMAGE

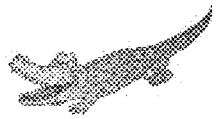

⋮

CLASSIFICATION SYSTEM

TECHNICAL FIELD

The present invention relates to a classification system that determines which class an obtained image or observation data belongs to using a great number of images, observation data, or the like (so-called "big data").

BACKGROUND ART

The development and widespread use of the Internet and the development of the technology called "cloud" that stores and parallel computes large-capacity data have enabled processing of a great amount of data, which was previously impossible. Classification systems that form a classifier by processing (learning) many pairs of images, observation data, or the like and the correct categories thereof (training data) and estimate the class that a newly obtained image or observation data belongs to have been rapidly developed, particularly, in the wake of the advent of the technique called deep learning.

In the field of image recognition, technologies that identify a person or read the emotion of the person, such as anger or sadness, from an image of the person's face have evolved. In the field of object recognition, technologies that estimate the type of an object on an image have evolved. In the field of medicine, technologies that identify the presence of a cancer or the like from a medical image, such as X-ray, CT, or microscopic image, have been actively studied.

Similarly, technologies that perform deep learning using a great amount of financial data or economic data and determine the credibility of corporations or predict rises and falls in the stock price have been actively studied. Also, in the field of medicine, technologies that predict the disease name of a patient having a certain symptom or finding or estimate an effective treatment using a great amount of data on the symptoms or laboratory findings of many patients have been studied.

Background art literature relating to the present application includes the following.

CITATION LIST

Patent Literature

Patent Literature 1: Japanese Unexamined Patent Application Publication No. 2018-175226
Patent Literature 2: Japanese Unexamined Patent Application Publication No. 2019-3396

SUMMARY OF INVENTION

Technical Problem

With respect to image recognition, it has been known that a target object may be difficult to recognize or may be misrecognized depending on the background thereof. It has been also known that due to improper use of characteristics of deep learning, a target object on an image may be misrecognized as a quite unlike image, that is, the target object may be misrecognized as a quite different one although it is seen as the same as the original object by a human.

Deep learning of an image divides a target image into grid small areas, performs computations on individual pixels in each small area, and gradually combines the computation results into continuous layers and thus is able to recognize the image without depending on, for example, the position or size of the face of a corresponding person. However, if such characteristics are improperly used and the individual small areas are moved from the original positions to different positions, the target object would be misrecognized as the same one as the original person although it is only seen as a strange-looking pattern by human eyes. Similarly, if the pixels in the individual small areas are replaced, the target object would be recognized as a person quite different from the original person although it is seen as quite the same person by human eyes.

Also, there has been an illusion as if all problems were solved by analyzing big data.

In each field, a thinking framework having high utility has been generated over a long period of time. If all data is flattened and analyzed without previously assuming any internal logic structure, already known ordinary knowledge is simply reconfirmed or an indefinable correlation is simply pointed out in not a few cases even if the amount of data is large.

Moreover, legal issues have been pointed out. Deep learning and the like use a neural network consisting of many layers. Even if a recognition result is obtained, it is difficult for a human to understand why such a recognition result has been obtained. Although the recognition accuracy has been increased, it is not 100%. Accordingly, misrecognition inevitably occurs and the user has to be responsible for the misrecognition.

At this time, the user has to be able to explain to third parties why such recognition has been reached. Otherwise, the user would suffer a risk, such as compensation for damage. Thus, there is a limit to the practical utility of deep learning and the like.

The present invention has been made to solve the above background art problems, and an object thereof is to provide a classification system that checks the appropriateness of individual candidate classes in an obtained candidate class list by previously constructing a database in which the attributes of classes are stored (class attribute storage means) and providing check means configured to make comparisons as to whether the candidate classes match class determination data, as well as allows a user to explain the reason for the classification.

Solution to Problem

As means for accomplishing the above object, a classification system of claim 1 includes class data acquisition means configured to obtain class determination data, classification means configured to perform classification on the basis of the class determination data, and class appropriateness check means configured to check appropriateness of individual candidate classes in a candidate class list obtained by the classification means using class attribute storage means in which attributes of the candidate classes are previously stored.

According to the classification system of claim 2, in the classification system of claim 1, the attributes include reference images of the candidate classes.

According to the classification system of claim 3, in the classification system of claim 1 or 2, the class attribute storage means includes tree structure class attribute storage means in which a parent-child relationship between classes is represented in a tree structure and an attribute of a parent is inherited as an attribute of a child class.

According to the classification system of claim 4, in the classification system of any one of claims 1 to 3, the class appropriateness check means includes class reliability evaluation means configured to evaluate reliability of the candidate classes by comparing the attributes of the candidate classes stored in the class attribute storage means against the class determination data acquired by the class data acquisition means.

In the classification system of claim 5, the classification system of any one of claims 1 to 4 includes class reliability evaluation means configured to, when classifying an image, evaluate reliability of the candidate classes by comparing at least one reference image of each of the candidate classes stored in the class attribute storage means against an image to be classified obtained by the class data acquisition means.

According to the classification system of claim 6, in the classification system of claim 4 or 5, the class reliability evaluation means includes class reliability evaluation criterion setting means configured to be able to set any numerical value as a class reliability evaluation criterion, and if obtained reliability of one of the candidate classes exceeds the class reliability evaluation criterion, the candidate class is determined as a classification result.

According to the classification system of claim 7, in the classification system of any one of claims 1 to 6, the class appropriateness check means includes additional class data request means configured to request additional class determination data from the class data acquisition means with respect to the attributes of the candidate classes stored in the class attribute storage means.

Advantageous Effects of Invention

The classification system of claim 1 includes the class data acquisition means and thus acquires images, symptoms, findings, or the like, which are targets to be classified.

This classification system includes the classification means and thus classifies pieces of class determination data into predetermined candidate class lists.

This classification system includes the class appropriateness check means and thus checks the appropriateness of the candidate classes in the candidate class list obtained by the classification means by comparing the attributes of the candidate classes against the class determination data.

In the classification system of claim 2, the attributes include the reference images of the candidate classes and thus similarity is evaluated by comparing the reference images against an image, which is class determination data.

The classification system of claim 3 includes the tree structure class attribute storage means and thus forms storage means that inherits the attributes of parent classes as attributes of child classes and thus has excellent storage, search, and other functions.

The classification system of claim 4 includes the class reliability evaluation means and thus evaluates the reliability of the candidate classes by comparing the attributes of the candidate classes stored in the class attribute storage means against the class determination data obtained by the class data acquisition means.

The classification system of claim 5 includes the class reliability evaluation means and thus evaluates the reliability of the candidate classes by comparing at least one reference image of each of the candidate classes stored in the class attribute storage means against an image to be classified obtained by the class data acquisition means.

The classification system of claim 6 includes the class reliability evaluation criterion setting means and thus is able to set any numerical value as a class reliability evaluation criterion and, if obtained reliability of one of the candidate classes exceeds the class reliability evaluation criterion, determines the candidate class as a classification result.

The classification system of 7 includes the additional class data request means and thus requests additional class determination data from the class data acquisition means with respect to the attributes of the candidate classes stored in the class attribute storage means.

BRIEF DESCRIPTION OF THE DRAWINGS

FIG. 3 is a diagram showing a process of learning a neural network classifier with pairs of symptoms or findings and the classes thereof.

FIG. 4 is a diagram showing a process of learning a classifier with pairs of symptoms or findings and the classes thereof and disease frequencies corresponding to symptoms or findings.

FIG. 5 is a diagram showing class attribute storage means.

DESCRIPTION OF EMBODIMENTS

The classification system includes the server apparatus, the database and the terminal. The server apparatus, the database and the terminal connected through network. The server apparatus is a prior computer. The server apparatus includes: an arithmetic apparatus including the processor, a main storage apparatus, an auxiliary storage apparatus, input apparatus, output apparatus, and communication apparatus. The arithmetic apparatus, the main storage apparatus, the auxiliary storage apparatus, input apparatus, output apparatus, the communication apparatus connected through a bus interface. The arithmetic apparatus includes the processor that can execute an instruction set. The main storage apparatus includes a volatile memory such as a random access memory (RAM). The auxiliary storage apparatus includes a recording medium such as a nonvolatile memory, and a recording method thereof is not limited. The recording medium indicates a hard disk drive (HDD) or a solid state drive (SSD), for example. The input apparatus is, for example, a keyboard device. The output apparatus includes, for example, display as a liquid crystal panel. The communication apparatus is a network interface that can connect to a network. The processor of the server apparatus executes the function of the units of the classification system including: a class data acquisition means, a classification means, a class appropriateness check means or the like. The database is composed of the auxiliary storage apparatus of the server apparatus or the auxiliary storage apparatus independent from the server apparatus. The database stores information managed by the classification system. The terminal is a prior computer including a processor.

Figure 1:
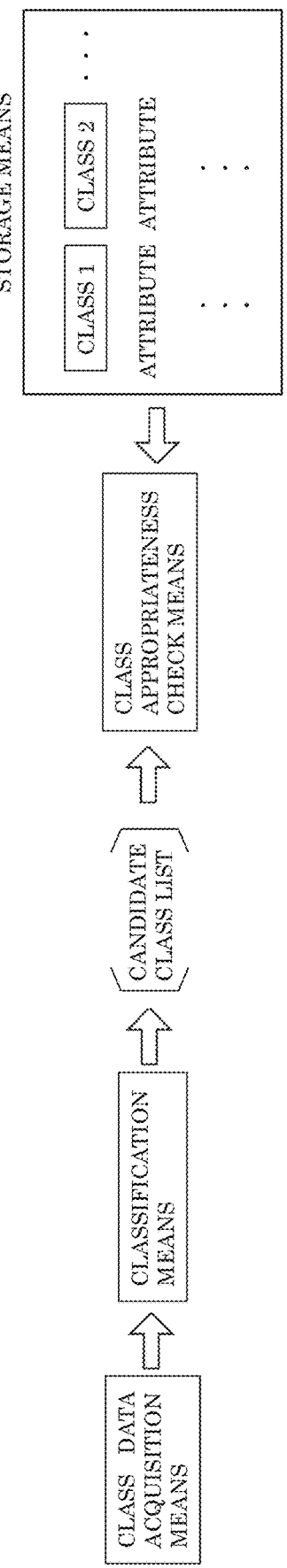
FIG. 1 is a diagram showing the overall configuration of the present invention.

FIG. 1 is a diagram showing the overall configuration of the present invention. Class data acquisition means acquires images, symptoms, findings, or the like, which are class determination data, and provides them to classification means. The class determination data may be acquired using any method: for images, they may be acquired, for example, by directly inputting camera images or reading an image file; and for symptoms, findings, or the like, they may be acquired, for example, by reading the description in electronic health records or reading any observation data file or time-series data file. The classification means classifies the provided class determination data to obtain a list of one or more candidate classes. The attributes of classes that can become candidates are previously stored so as to be associated with the classes (class attribute storage means). The candidate classes obtained by the classification means are checked for appropriateness by comparing the attributes of the candidate classes against the class determination data (class appropriateness check means).

Figure 2:
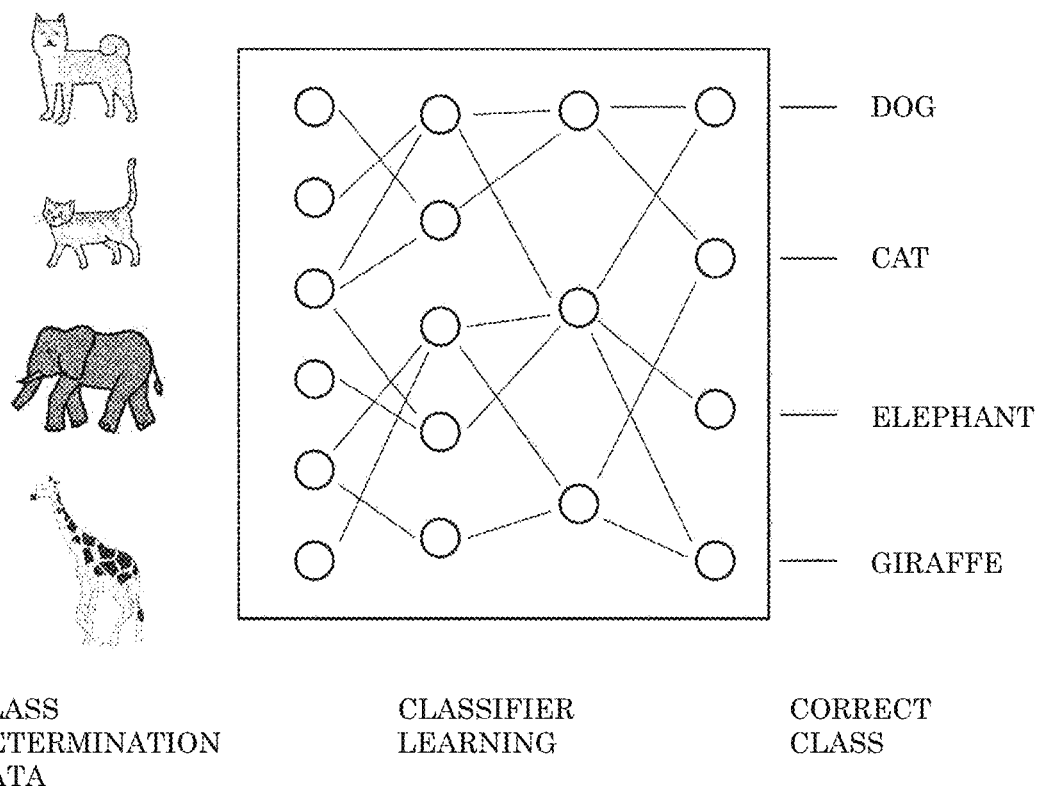
FIG. 2 is a diagram showing a process of learning a neural network classifier with pairs of images and the classes thereof.

FIG. 2 is an example of classifier learning performed by a classification system that determines the classes of animals from images of the animals. Many pairs of images, which are class determination data, and the correct classes thereof are prepared, and classifier learning is performed so that the accuracy rate is improved. This example shows classification means that uses a neural network, such as deep learning.

FIG. 3 shows an example in which a neural network classifier is learned with many pairs of listed symptoms or finding vectors obtained from electronic health records or the like and confirmed correct diagnosis names (correct classes).

As with FIG. 3, FIG. 4 shows an example in which a classifier that obtains the frequency distributions of diagnosis names (classes) corresponding to symptoms or findings is learned with many pairs of listed symptoms or finding vectors obtained from electronic health records or the like and confirmed correct diagnosis names (correct classes). The candidate diagnosis name (class) list is created by combining the frequencies of occurrence (priori probabilities) of diagnosis names corresponding to positive or negative symptoms or findings in cases and observed multiple symptoms or findings and using Bayesian probabilities (posteriori probabilities) or the like.

That is, the diagnosis names estimated from the many symptoms or findings are narrowed down by combining the distributions of the diagnosis names corresponding to the obtained symptoms or findings.

Note that if the symptoms and findings have correlations, the distributions of disease names corresponding to both are naturally similar and therefore the amount of additional information is small. For this reason, such disease name distributions have to be depreciated accordingly.

In this case, it is useful to previously obtain disease name distributions corresponding to pairs of symptoms and findings. As seen above, the classifier of the classification means of the present invention need not be learned using deep learning and may be learned using any type of machine learning, such as a support vector machine, or frequency distribution. That is, an appropriate classifier may be used depending on the situation.

FIG. 5 is a diagram showing the class attribute storage means. Various attributes, images, or the like are stored for each class. The attribute type or arrangement, attribute category or tag name, or the like can be set arbitrarily. Also, any number of images can be set for each class.

Figure 6:
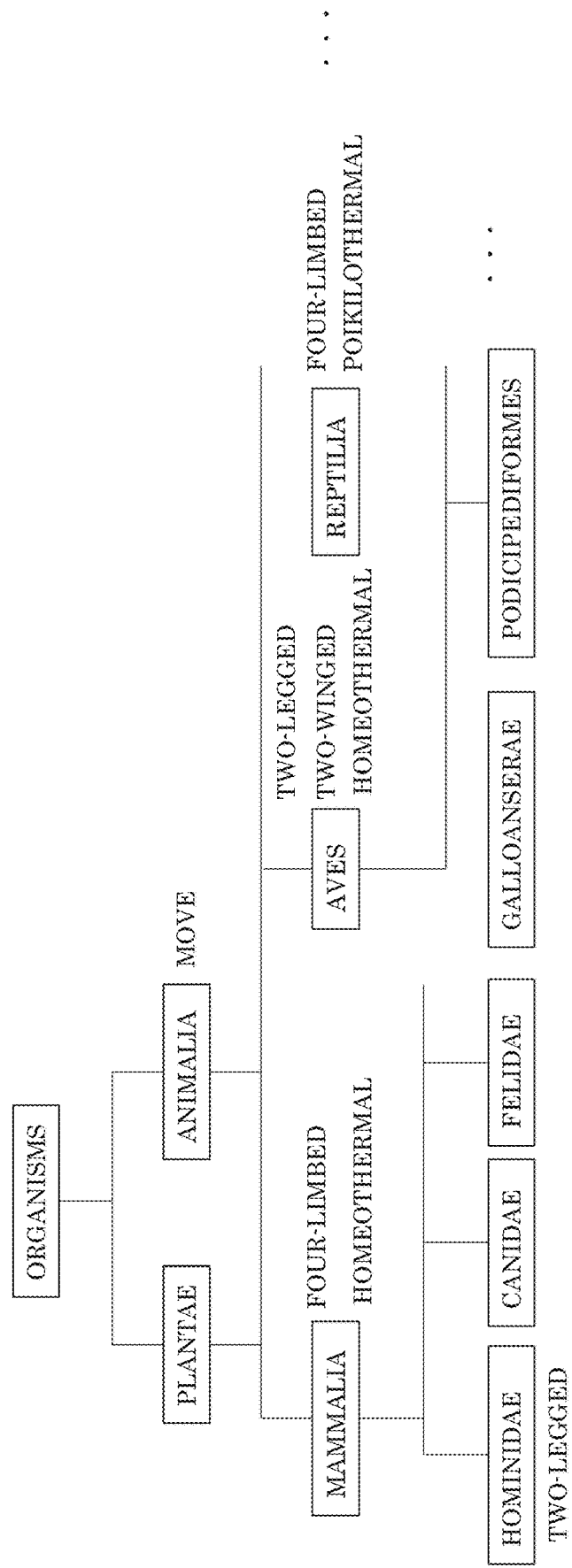
FIG. 6 is a diagram showing tree structure class attribute storage means.

FIG. 6 is a diagram showing tree structure class attribute storage means. As shown in FIG. 5, many attributes of classes overlap with each other. By organizing common attributes of classes into the attributes of a higher class, as seen in a phylogenetic tree, the amount of description of the attributes is minimized, resulting in facilitation of search.

A child class inherits the attributes of the parent class thereof, as well as holds attributes specific thereto.

If the attributes inherited from the parent class are changed and overwritten at the child class level, a grandchild class inherits the changed attributes of the child class as attributes thereof.

Figure 7:
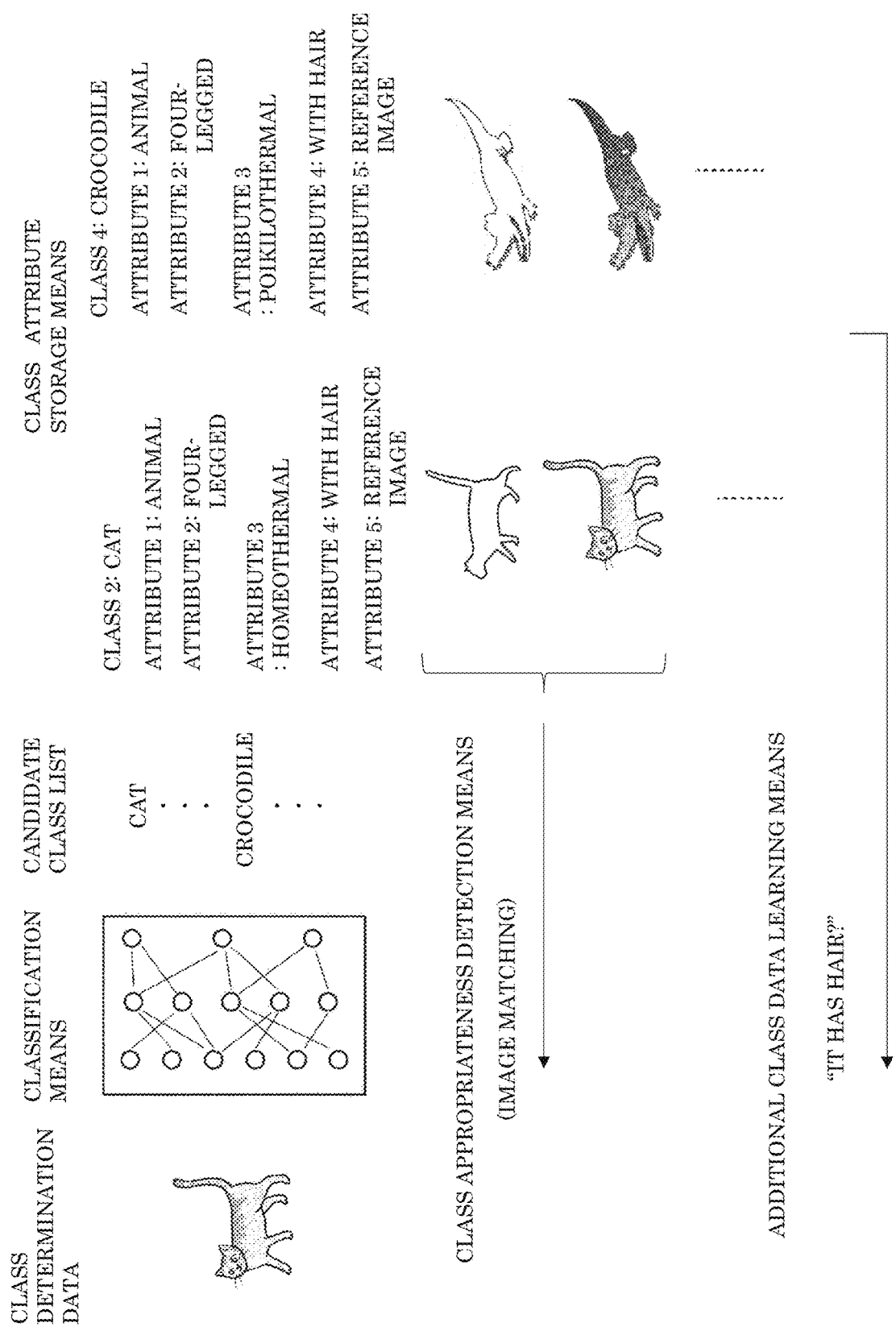
FIG. 7 is a diagram showing image additional class data request means.

FIG. 7 is a diagram showing image class appropriateness check mean.

It is assumed that "cat" and "crocodile" are provided as candidate classes of an image, which is given class determination data.

The similarity of reference images of "cat" and "crocodile" stored in the class attribute storage means is evaluated by making comparisons between the reference images and the image, which is class determination data. The appropriateness of the candidate classes is checked on the basis of the similarity, and a candidate class having the highest similarity is estimated as an appropriate class.

In this case, the image, which is class determination data, is inputted to classification means, and a small number of candidate classes are selected from among thousands to tens of thousands of classes. The reason why those candidate classes have been selected is typically unknown.

Since this process is a stochastic process, there is always a possibility that the candidate classes may be erroneous ones, as a matter of course.

Even if erroneous candidate classes are selected, it would be difficult to explain the reason.

On the other hand, the class appropriateness check means according to the present invention compares reference images already stored in the class attribute storage means, of selected some candidate classes against the class determination data and checks the appropriateness of the candidate classes on the basis of the evaluated similarity. That is, even if the reliability of a candidate class is not high at the time point when a candidate class list is obtained by inputting the image, which is class determination data, to the classifier, the accuracy of the candidate class is significantly improved by comparing many reference images previously stored as attributes of this candidate class against the image, which is class determination data.

Moreover, by automatically or manually checking whether the attributes of this candidate class stored in the class attribute storage means match the image, the appropriateness of the candidate class is increased and the reason why this candidate class has been determined as the class of the image is provided.

Also, if the additional class data request means makes an inquiry, such as whether "it has hair?," to the class data acquisition means, the candidate classes ("cat" and "crocodile" in FIG. 7) can be accurately distinguished from each other.

Figure 8:
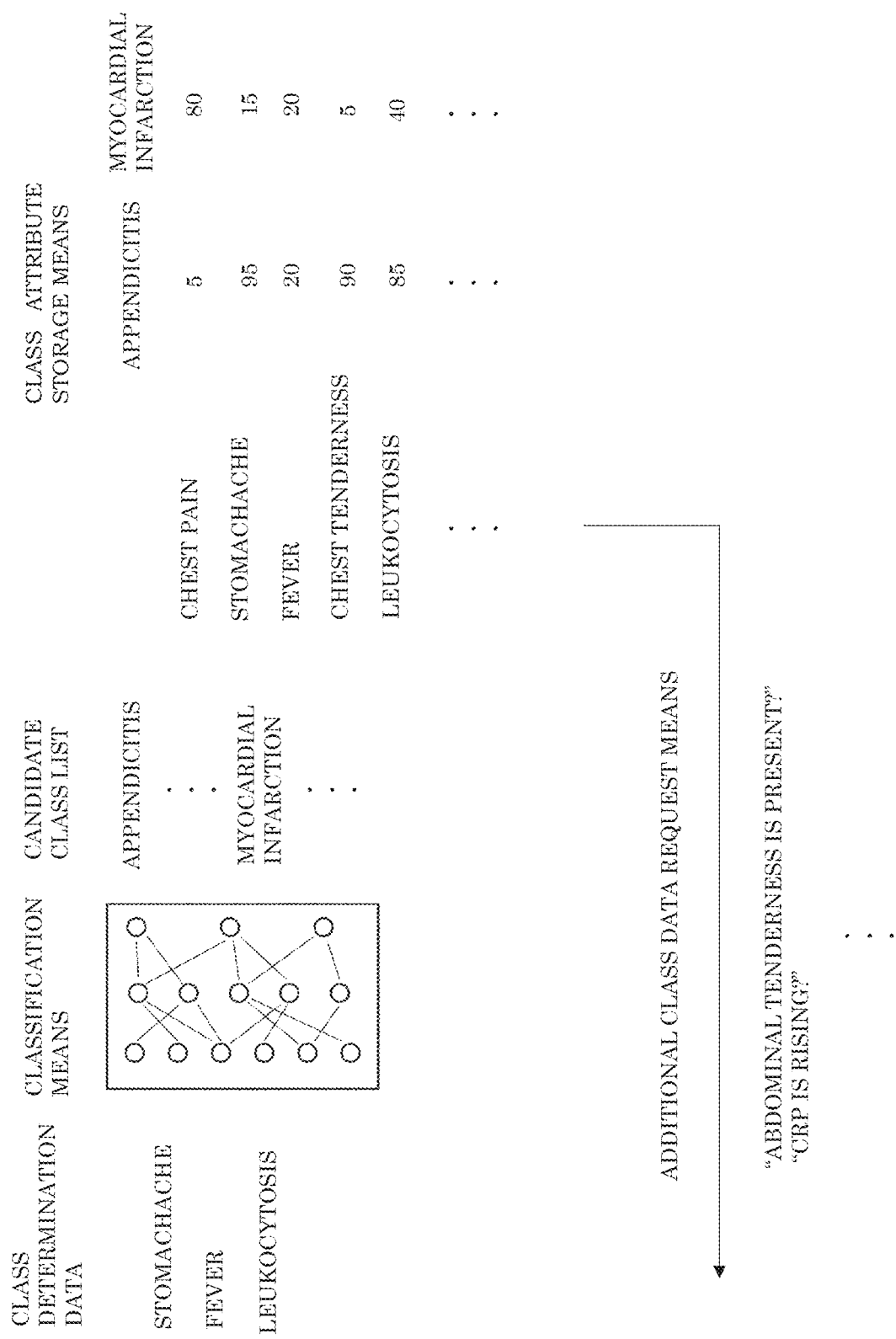
FIG. 8 is a diagram showing symptom/finding additional class data request means.

FIG. 8 is a diagram showing symptom/finding additional class data request means.

It is assumed that candidate classes "appendicitis" and "myocardial infarction" are provided with respect to symptom/finding vectors "stomachache," "fever," and "leukocytosis," which are given class determination data.

The observation frequencies of symptoms or findings are stored as the attributes of the classes "appendicitis" and "myocardial infarction" in the class attribute storage means (priori probabilities in Bayesian probability).

By applying the symptom/finding vectors obtained by the class data acquisition means to the priori probabilities, posteriori probabilities that the respective candidate classes may be the disease name are obtained.

A candidate class having the highest posteriori probability is estimated as an appropriate class.

A small number of candidate classes are selected from among thousands to tens of thousands of classes by inputting symptom/finding vectors, which are class determination data, to classification means. The reason why those candidate classes have been selected is typically unknown. Since this process is a stochastic process, there is always a possibility that the candidate classes may be erroneous candidate classes, as a matter of course. Even if erroneous candidate classes are selected, it is difficult to explain the reason.

On the other hand, the class appropriateness check means according to the present invention compares the frequencies of occurrence (priori probabilities) of symptoms or findings already stored in the class attribute storage means, of selected some candidate classes against the symptom/finding vectors and checks the appropriateness of the candidate classes on the basis of the evaluated posteriori probabilities.

Moreover, by additionally automatically or manually checking whether the attributes of the respective candidate classes stored in the class attribute storage means match the symptom/finding vectors, the appropriateness of a candidate class is increased and the reason why this candidate class has been determined as the class of the symptom/finding vectors is provided.

Note that if the symptoms and findings have correlations, symptom/finding distributions of disease names corresponding to both are naturally similar and therefore the amount of additional information is small. For this reason, such symptom/finding distributions is depreciated according to the correlations. In this case, it is useful to previously obtain the frequencies of occurrence of pairs of symptoms and findings of each disease name. Since pairs of symptoms and findings having high occurrence frequencies are estimated to have correlations, depreciated posteriori probabilities are estimated.

Also, if the additional class data request means makes an inquiry, such as "abdominal tenderness is present?" or "CRP is rising?," to the class data acquisition means (e.g., electronic health records), the candidate classes ("appendicitis" and "myocardial infarction" in FIG. 8) can be accurately distinguished from each other.

Figure 9:
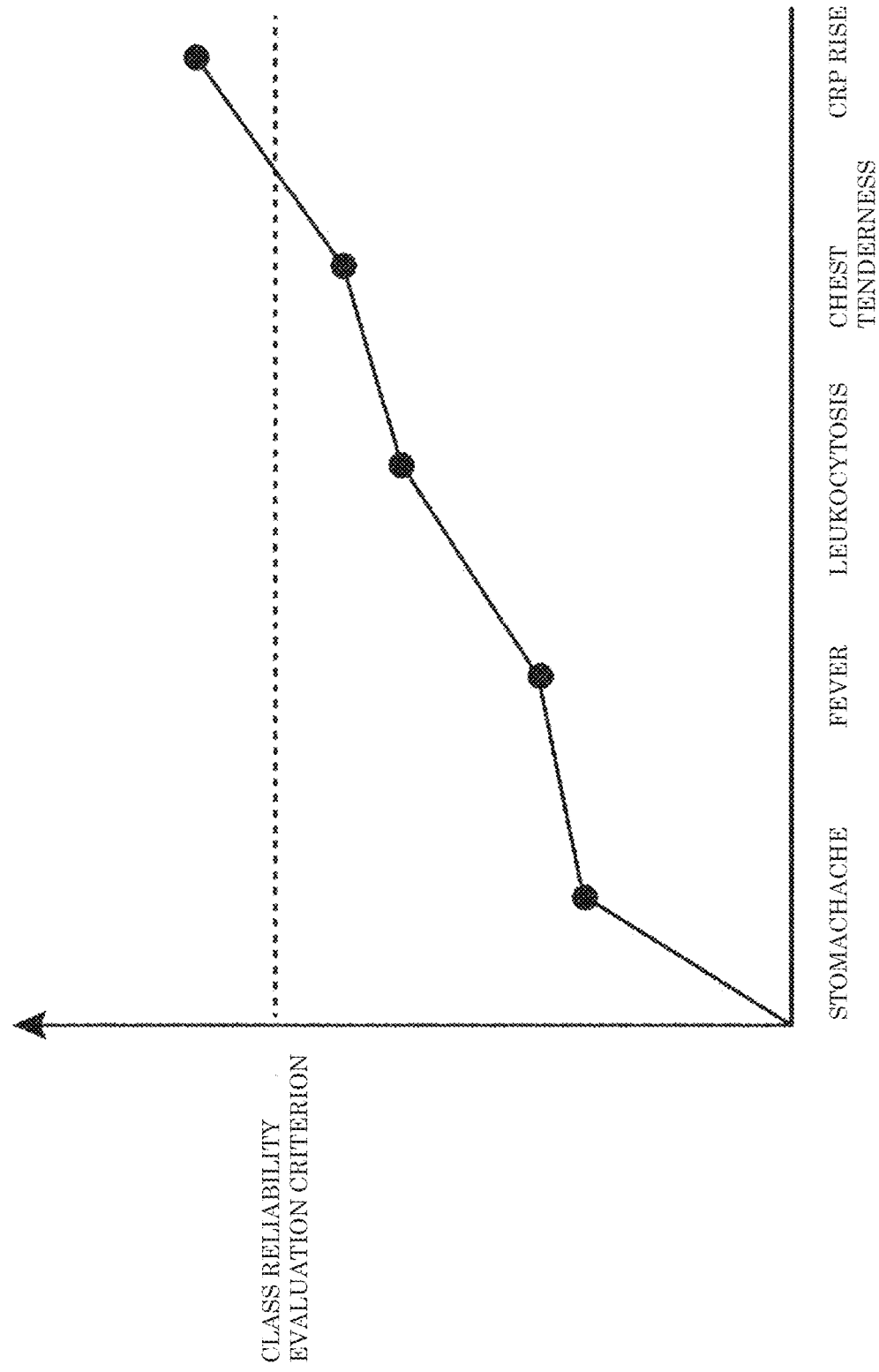
FIG. 9 is a diagram showing a process in which symptoms or findings are added by the additional class data request means in addition to the initial symptoms or findings, the classification reliability is improved, and a class exceeding a class reliability evaluation criterion is confirmed.

FIG. 9 is a diagram showing an example in which the additional class data request means adds a symptom or finding in addition to the initial symptoms or findings, the reliability of the classes, such as Bayesian posteriori probability, is improved, and a candidate class exceeding the class reliability evaluation criterion is finally confirmed as the class. The level to which reliability should be pursued (class reliability evaluation criterion) is properly set in accordance with the situation.

As described above, there has been an illusion as if all problems were solved by analyzing big data. In each field, a thinking framework having high utility has been formed over a long period of time. If all data is flattened and analyzed without previously assuming any internal logic structure, already known ordinary knowledge is simply reconfirmed or an indefinable correlation is simply pointed out in not a few cases even if the amount of data is large. In the present invention, the class attribute storage means, in particular, the tree structure attribute storage structure reflects a thinking framework in each field. By using the class appropriateness check means that utilizes the thinking frameworks of children, a significant improvement in the classification accuracy can be expected. Also, by checking whether the attributes of the respective candidate classes match the class determination data, the reason why a candidate class has been determined as the class of the class determination data is provided.

The present invention compares the attributes, including the reference images, already stored in the class attribute storage means, of the candidate classes in the candidate class list obtained by the classifier against the class determination data and, when necessary, adds class determination data using the additional class data request means and makes comparisons. These processes correspond to multi-factor authentication in security. Even if improper class determination data is inputted to the classifier and the classifier selects erroneous candidate classes, the erroneous candidate classes are eliminated by comparing quite different attributes thereof, including reference images, with proper class determination data.

While an embodiment of the present invention has been described, the specific configuration of the present invention is not limited to the embodiment. Design changes and the like in the embodiment are included in the present invention without departing from the spirit and scope of the invention.

In the case of image recognition, the present invention can be applied not only to the images of the animals described as examples but also to any type of images, such as those of human faces, objects, or the like. While the present invention has been applied to the issue in the field of medicine as an example, it can be applied to an issue in any field, such as a determination as to whether there is a possibility that loan loss may occur or rises and falls in the stock price, as long as the issue relates to classification.

The invention claimed is:

1. A classification system for estimating a diagnosis name from at least one symptom and/or finding comprising:
   at least one memory storing instructions to perform operations; and
   at least one processor configured to execute the instructions, the operations comprising:
   (i) recording a plurality of candidate classes and class attributes for each of the plurality of candidate classes;
   (ii) in a learning phase of the classification system, learning pairs of
      (a) symptoms/findings and
      (b) their correct candidate classes, which are diagnosis names;
   (iii) in an operation phase of the classification system, acquiring symptoms/findings as the class attributes comprising attributes of an object to be classified;
   (iv) in the operation phase of the classification system, through a classification using the class attributes acquired in (iii) as an input, obtaining a diagnosis name list, consisting of a list of a portion of the candidate classes selected from the plurality of candidate classes that is less than all of the plurality of candidate classes in (i); and
   (v) checking the appropriateness of the classification made in (iv) by comparing the class attributes of an individual candidate class in the diagnosis name list with the class attributes in (i) corresponding to the individual candidate class.

2. The classification system of claim 1, wherein the attributes include reference images of the candidate classes.

3. The classification system of claim 1, wherein recording the class attributes comprises storing the class attributes as a tree structure in which a parent-child relationship between classes is represented in the tree structure and an attribute of a parent is inherited as an attribute of a child class.

4. The classification system of claim 1, wherein checking the appropriateness of the classification comprises class reliability evaluating reliability of the candidate classes, comprising determining, for each respective candidate class in the candidate classes, a reliability of the respective candidate class by comparing the attributes of the respective candidate class recorded in step (i) against class determination data.

5. The classification system of claim 1, wherein the operations further comprise evaluating reliability of the candidate classes, when classifying an image, by comparing at least one reference image of each of the candidate classes recorded in step (i) against an image to be classified.

6. The classification system of claim 4, wherein
   evaluating reliability further comprises setting a numerical value as a class reliability evaluation criterion, and
   if obtained reliability of one of the candidate classes exceeds the class reliability evaluation criterion, the candidate class is determined as a classification result.

7. The classification system of claim 1, wherein checking the appropriateness of the classification comprises requesting additional class determination data from users of the classification system with respect to the attributes of the candidate classes recorded in step (i).

* * * * *